US009349265B2

(12) United States Patent
Grant et al.

(10) Patent No.: US 9,349,265 B2
(45) Date of Patent: May 24, 2016

(54) HIGH HOLDING FORCE SECURITY DEVICE

(71) Applicant: InVue Security Products Inc., Charlotte, NC (US)

(72) Inventors: Jeffrey A. Grant, Charlotte, NC (US); Christopher J. Fawcett, Charlotte, NC (US); Larry T. McKinney, Huntersville, NC (US); Larry Keith Hooks, Jr., Gahanna, OH (US)

(73) Assignee: InVue Security Products Inc., Charlotte, NC (US)

( * ) Notice: Subject to any disclaimer, the term of this patent is extended or adjusted under 35 U.S.C. 154(b) by 65 days.

(21) Appl. No.: 14/207,824

(22) Filed: Mar. 13, 2014

(65) Prior Publication Data

US 2014/0266723 A1    Sep. 18, 2014

Related U.S. Application Data

(60) Provisional application No. 61/787,523, filed on Mar. 15, 2013.

(51) Int. Cl.
*G08B 13/12* (2006.01)
*G08B 13/14* (2006.01)
*H05K 7/02* (2006.01)

(52) U.S. Cl.
CPC ................... *G08B 13/1445* (2013.01)

(58) Field of Classification Search
CPC ........... G08B 13/1445; G08B 13/1463; G08B 13/2434
USPC ...................................................... 340/568.2
See application file for complete search history.

(56) References Cited

U.S. PATENT DOCUMENTS

| 4,772,878 | A | 9/1988 | Kane |
| 5,649,436 | A | 7/1997 | Davidge |
| 6,756,900 | B2 | 6/2004 | Leyden et al. |
| 6,851,957 | B1 | 2/2005 | Bhogal et al. |
| 7,081,822 | B2 | 7/2006 | Leyden et al. |
| 7,132,952 | B2 | 11/2006 | Leyden et al. |
| 7,202,417 | B2 | 4/2007 | Marszalek et al. |
| 7,592,548 | B2 | 9/2009 | Marszalek et al. |
| 7,724,135 | B2 | 5/2010 | Rapp et al. |
| 2006/0001541 | A1* | 1/2006 | Leyden ................ G08B 13/149 340/568.2 |
| 2008/0034816 | A1 | 2/2008 | Lu |
| 2009/0320532 | A1 | 12/2009 | Bonato |
| 2010/0281930 | A1 | 11/2010 | Hacker |

(Continued)

FOREIGN PATENT DOCUMENTS

| EP | 1811109 A2 | 7/2007 |
| WO | 2008094137 A2 | 8/2008 |

OTHER PUBLICATIONS

MTI, "Freedom Maxx The Best Shopper Experience Is Now Also The Most Secure", 2011, pp. 1-2, Hillsboro, Oregon.

(Continued)

*Primary Examiner* — Jack K Wang
(74) *Attorney, Agent, or Firm* — InVue Security Products Inc.

(57) ABSTRACT

A merchandise display security device for displaying and protecting an article of merchandise from theft is provided. The security device includes a mounting base and at least one movable member coupled to the mounting base and configured to releasably attach the mounting base to the article of merchandise. The security device may also include a housing configured to be secured to the mounting base.

18 Claims, 6 Drawing Sheets

(56) References Cited

U.S. PATENT DOCUMENTS

2011/0187531 A1    8/2011   Oehl et al.
2011/0309934 A1*   12/2011  Henson .............. G08B 13/1472
                                                     340/568.2
2012/0217371 A1    8/2012   Abdollahzadeh et al.

OTHER PUBLICATIONS

MTI, "Freedom Maxx", Mar. 4, 2013, pp. 1-4, Hillsboro, Oregon.
Jonas Allen, "MTI Launches Industry-First Tablet Merchandising Security that Provides Power to All Tablets", Feb. 21, 2012, pp. 1-7, Hillsboro, Oregon.

* cited by examiner

HIGH HOLDING FORCE SECURITY DEVICE

CROSS REFERENCE TO RELATED APPLICATIONS

This non-provisional utility patent application claims the benefit of priority of U.S. Provisional Application No. 61/787,523, filed on Mar. 15, 2013, entitled High Holding Force Security Device, the contents of which are hereby incorporated by reference in their entirety.

FIELD OF THE INVENTION

Embodiments of the present invention relate generally to merchandise display security devices for displaying and protecting an article of merchandise from theft.

BACKGROUND OF THE INVENTION

Retailers routinely display articles of merchandise, such as portable computers (e.g. notebooks, laptops, tablets, etc.), e-readers, media players, and the like for customers to evaluate before making a purchase. These articles of merchandise are continually being made smaller and lighter in weight due to advances in technology and materials. As a result, such merchandise is increasingly vulnerable and susceptible to theft. At the same time, the retail price and profit margin for such merchandise continues to decline. Accordingly, these articles of merchandise need to be secured by a security device that effectively and cost efficiently protects the merchandise from theft.

Merchandise display security devices for displaying and protecting articles of merchandise attached to a mechanical tether are known. However, the known devices are not configured to both adequately secure the article of merchandise and to be removed quickly and easily.

Accordingly, there exists a need for an improved merchandise display security device for protecting an article of merchandise from theft. There exists a further need for a merchandise display security tether that may be quickly and easily removed from an article of merchandise without causing damage to the merchandise.

BRIEF SUMMARY

Embodiments of the present invention are directed to merchandise display security devices and methods for displaying and protecting an article of merchandise from theft. In one embodiment, the security device includes a mounting base and at least one movable member coupled to the mounting base and configured to releasably attach the mounting base to the article of merchandise.

In some embodiments, the security device includes a plurality of movable members coupled to the mounting base. The security device may further include a housing configured to be secured to the mounting base, wherein the housing is configured to engage the mounting base to prevent access to the at least one movable member. In some aspects, the at least one movable member is rotatably attached to the mounting base. In other aspects, the security device includes a security cable having a first end attached to the mounting base and a second end configured to be secured to a display surface. The security cable includes an anchor assembly at the second end such that the security cable is configured to be anchored to the display surface. The anchor assembly may include a plurality of ports for electrically coupling with the article of merchandise and one or more accessories. In another aspect, an adhesive is disposed on the at least one movable member. In some cases, the at least one movable member includes at least one slot for receiving a removal tool. In one embodiment, the security device also includes an alarming power cable extending from the mounting base and configured to engage a power input port of the article of merchandise. Moreover, the security device may include a port for communicating with a key for arming or disarming the security device.

According to another embodiment, a method for displaying and protecting an article of merchandise from theft is provided. The method includes providing a merchandise display security device comprising a mounting base, wherein the mounting base includes at least one movable member. The method also includes securing the at least one movable member to the article of merchandise.

According to various aspects of the method, the method further includes attaching a first end of a security cable to a display surface, a second end of the security cable being connected to the mounting base. In one embodiment, the merchandise display security device comprises a housing, and the method includes positioning the housing over the mounting base, wherein the housing is configured to prevent access to the at least one movable member. The security step may include releasably adhering the at least one movable member to the article of merchandise. In another aspect, the securing step includes securing a plurality of movable members to the article of merchandise.

According to another embodiment, a merchandise display security device for displaying and protecting an article of merchandise from theft is provided. The security device includes a mounting base and at least one rotatable member coupled to the mounting base for releasably attaching the mounting base to the article of merchandise. The security device also includes a security cable having a first end attached to the mounting base and a second end configured for attachment to a display surface. In some cases, the security device also includes a housing configured to be positioned over the mounting base and the at least one movable member, wherein the housing is configured to be removably secured to the mounting base so as to prevent access to the at least one movable member. In one aspect, the at least one rotatable member comprises an adhesive for releasably attaching the mounting base to the article of merchandise

DETAILED DESCRIPTION OF EMBODIMENTS OF THE INVENTION

Figure 1:
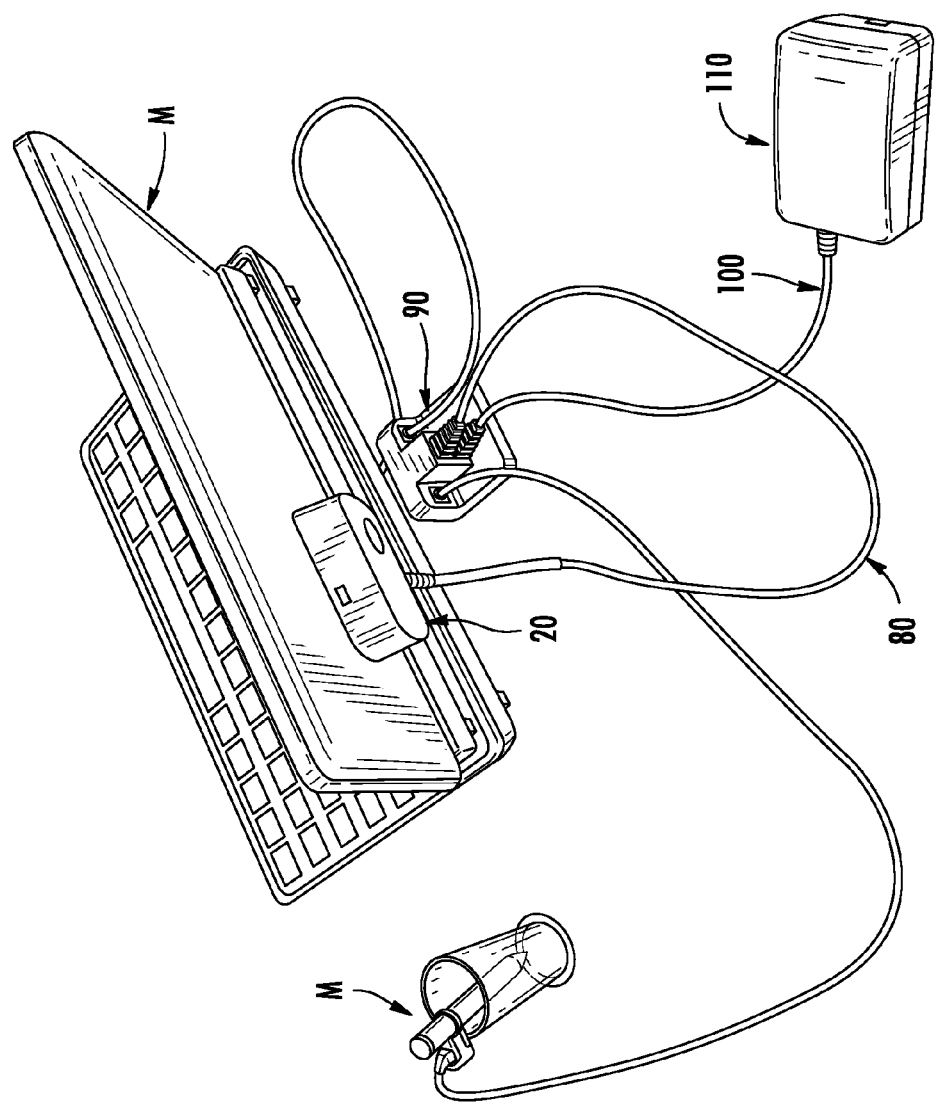
FIG. 1 is perspective view of a merchandise display security device according to one embodiment of the present invention.
Figure 2:
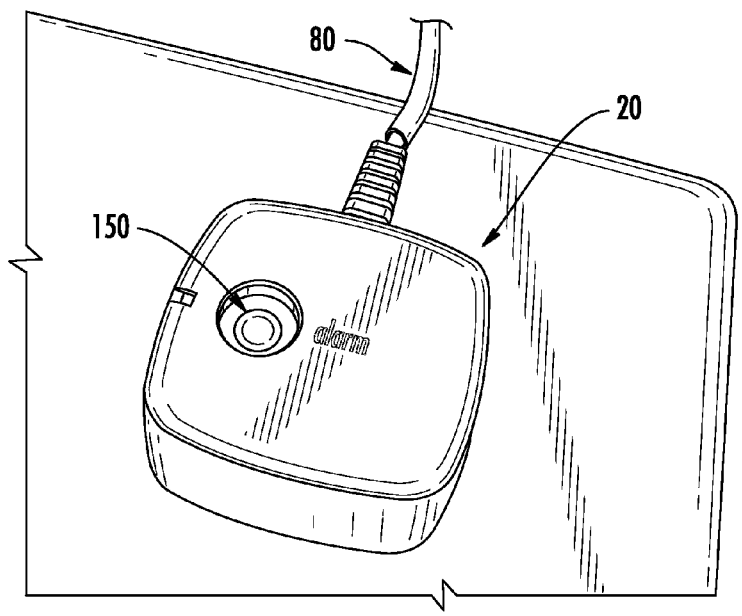
FIG. 2 is an enlarged view of a merchandise display security tether secured to an article of merchandise according to one embodiment of the present invention.
Figure 3:
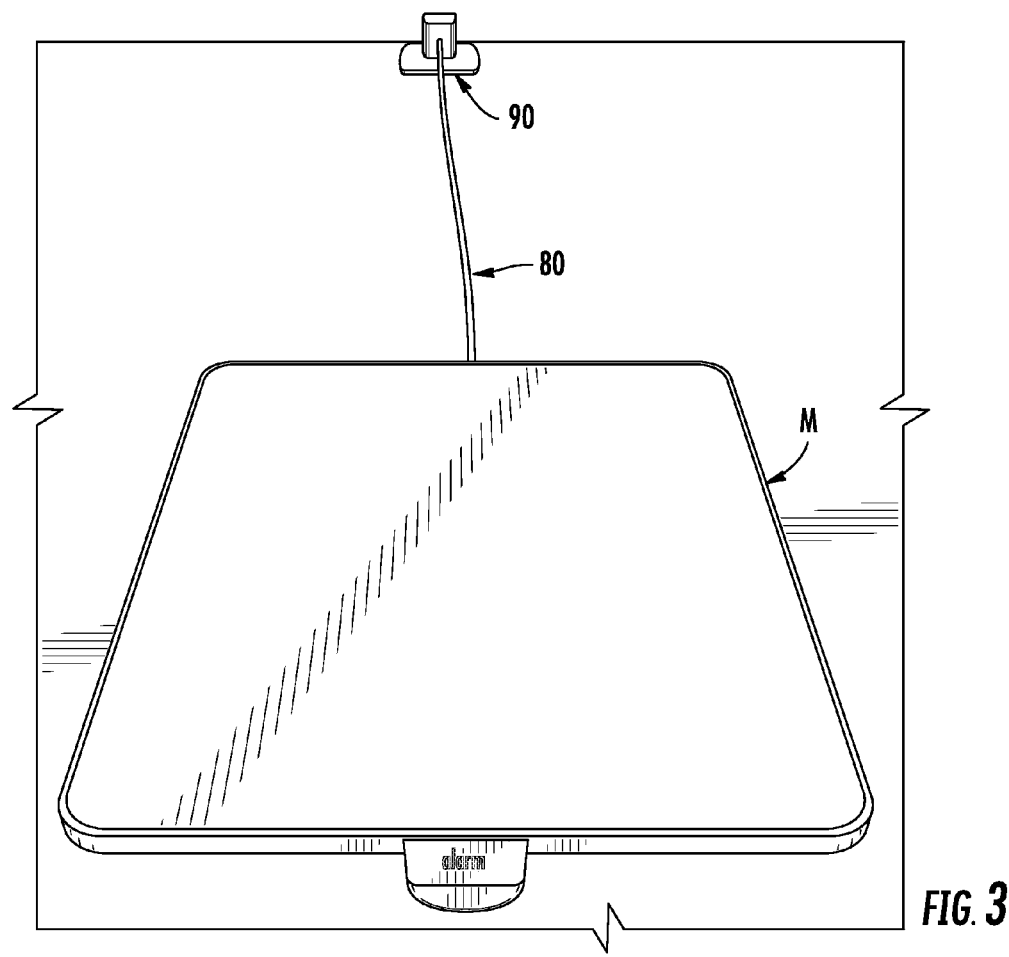
FIG. 3 is a perspective view of an article of merchandise secured to a display surface with a cable and an anchor assembly according to an embodiment of the present invention.

Embodiments of the present invention will now be described more fully hereinafter with reference to the accompanying drawings, in which various embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Referring now to the accompanying drawing figures wherein like reference numerals denote like elements throughout the various views, one or more embodiments of a merchandise display security device for displaying and protecting an article of merchandise from theft are shown. More particularly, the drawing figures show embodiments of a merchandise display security tether, indicated generally by reference character 20, for being attached to an article of merchandise, indicated generally by reference character M. The article of merchandise M may be a display model or an operational sample of electronic merchandise, such as portable computers (e.g. notebooks, laptops, tablets, etc.), e-readers, media players, stylus, keyboards, and the like, for a customer to examine before making a decision to purchase the item. The article of merchandise M is attached to the merchandise display security tether 20 in a manner that permits a prospective purchaser to evaluate the operation and features of the merchandise, while protecting the merchandise from a potential thief.

Figure 5:
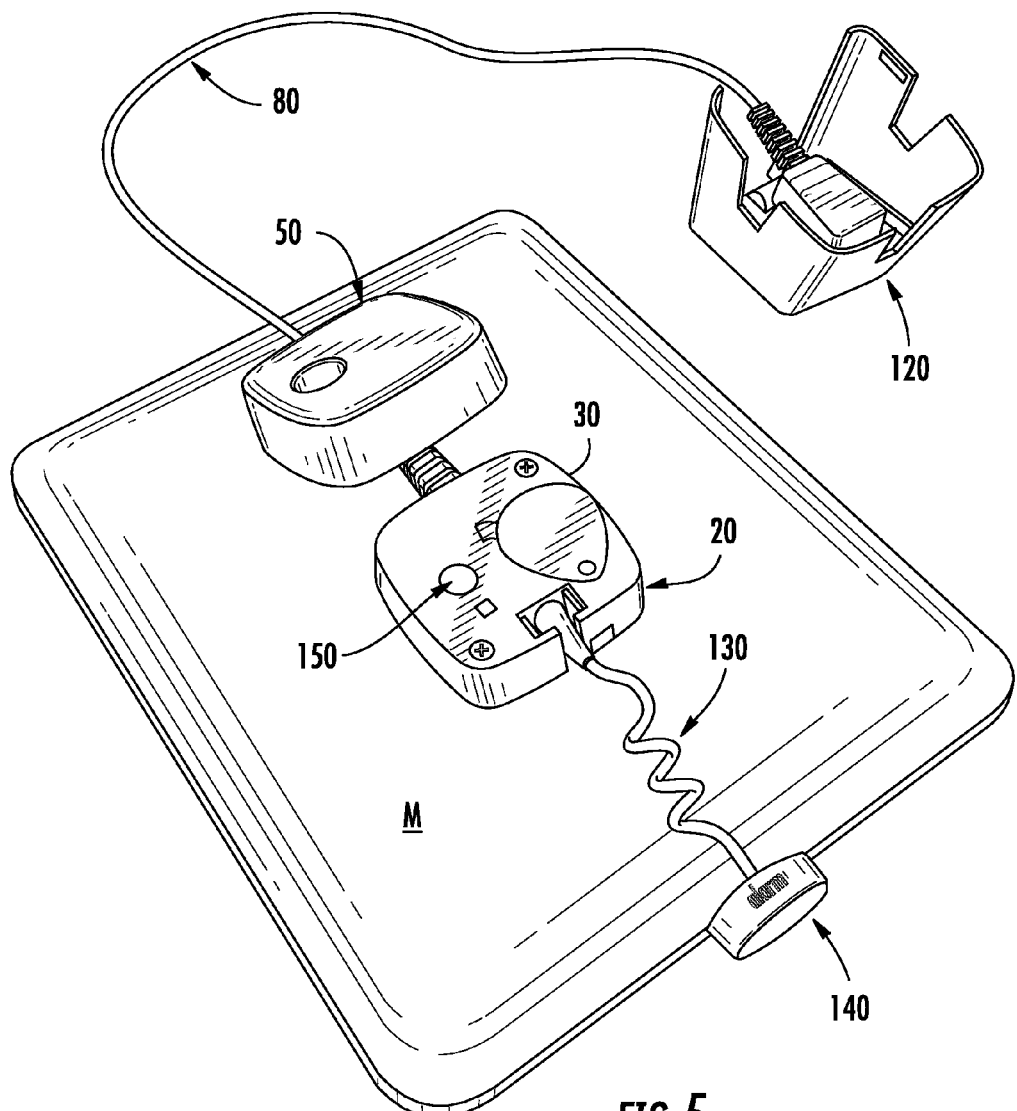
FIG. 5 is a partially disassembled view of the merchandise display security tether of FIG. 4.
Figure 6:
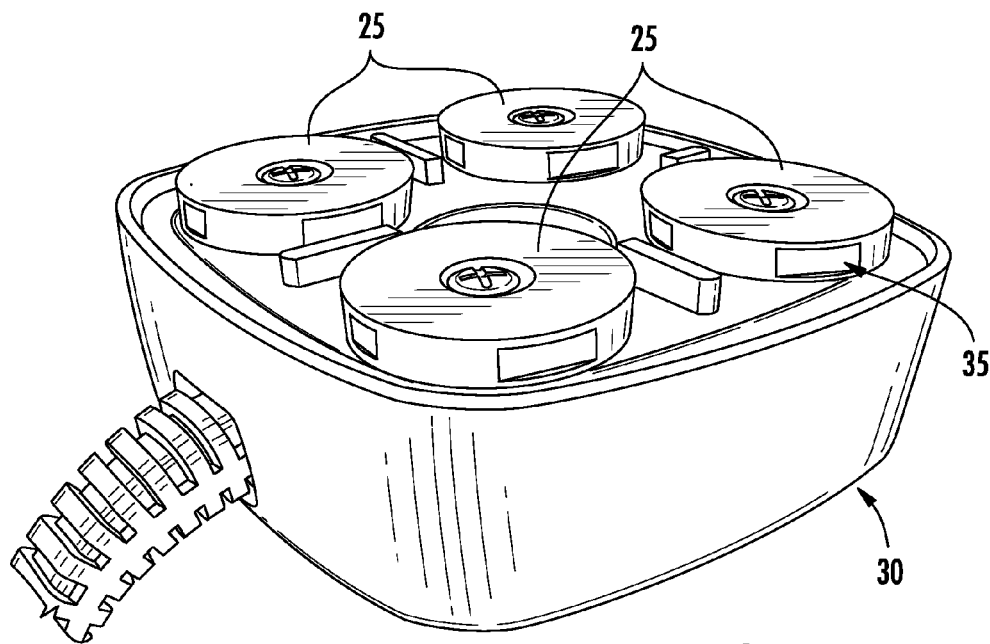
FIG. 6 is an enlarged perspective view of a merchandise display security tether according to one embodiment of the present invention.
Figure 8:
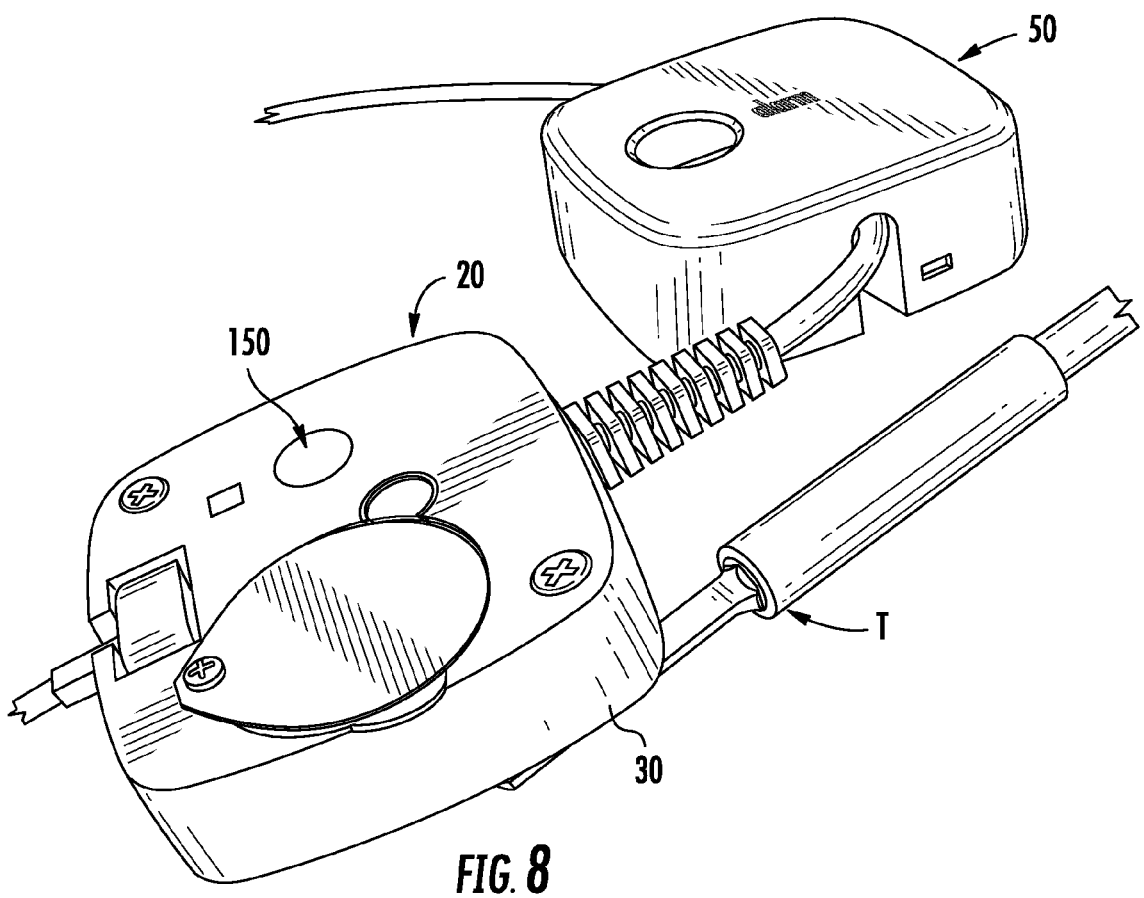
FIG. 8 is an enlarged perspective view of a merchandise display security tether engaged with a removal tool according to an embodiment of the present invention.

According to one embodiment shown in FIGS. 5 and 8, the merchandise display security tether 20 includes at least one movable member, a mounting base 30, and a housing 50. The housing 50 is configured to prevent access to the mounting base 30 that is releasably attached to the article of merchandise M by one or more movable members 25. Each movable member 25 may include an adhesive disposed thereon that is configured to attach to the article of merchandise M and to readily release the mounting base 30 from the article of merchandise M in the event that the merchandise is to be removed from a retail sales display, for example, to be sold. One or more movable members 25 may be employed, although a plurality of movable members may be used as shown, for example, in FIG. 6. The movable members 25 may be arranged on the mounting base 30 in a variety of manners, such as in a symmetric formation for uniform attachment to the article of merchandise M. The movable members 25 may be various shapes and sizes depending on the size of the merchandise display security tether 20 and the article of merchandise M. For example, the movable members 25 may be circular, square, rectangular, etc. In addition, each movable member 25 may be rotatably or pivotally attached to the mounting base 30 to facilitate rotation or pivoting thereabout.

Figure 7:
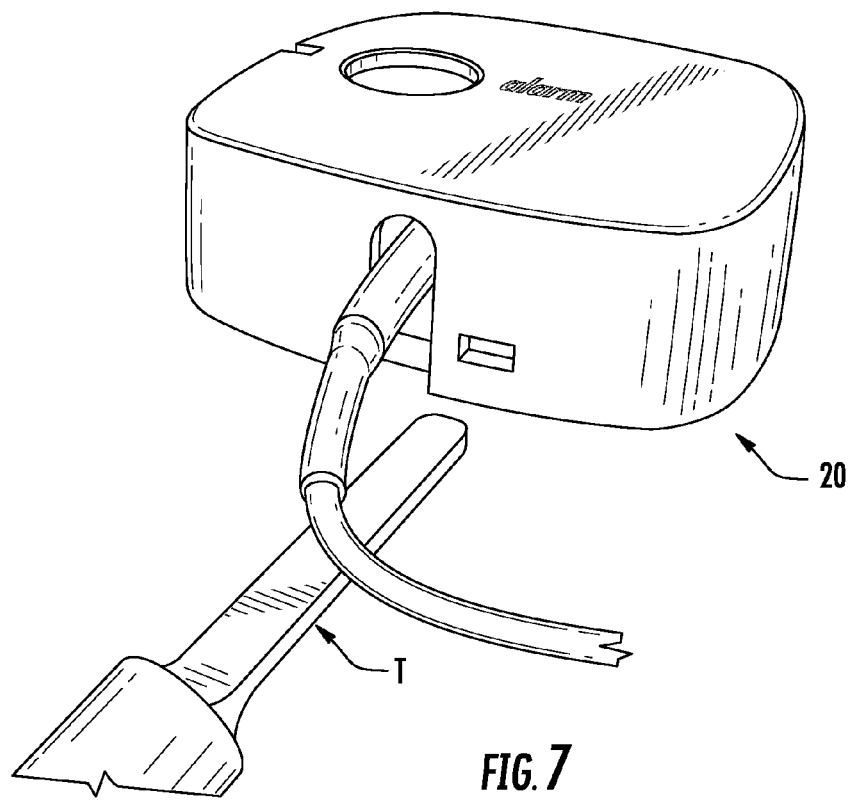
FIG. 7 is an enlarged perspective view of a merchandise display security tether and a removal tool according to an embodiment of the present invention.

Instead of one large adhesive adhering an article of merchandise M product to a security device, in one embodiment the adhesive is effectively divided into several smaller pieces with a surface area equivalent to the one larger piece. This allows the removal force to remain high. Each of the smaller individual pieces of adhesives is mounted on a respective movable member 25. For example, the adhesive might be mounted on a rotating wheel. A tool T, which may be particularly designed to engage each movable wheel and be proprietary, may be used by the store associate (see, e.g., FIGS. 7 and 8). For example the tool T could be configured to engage a slot 35 defined in each movable member. This tool T engages with the movable member 25 of the security device with the adhesive attached and is used to overcome the adhesive force of a single piece of adhesive. This might be accomplished, for example, by a twisting motion of a movable member 25 to which the adhesive is attached, shearing the adhesive from the surface of the article of merchandise M. Because there are several small pieces of adhesive, this removal requires much less force than attempting to remove a large piece of adhesive all at once. For example, if the adhesive were four separate pieces on four movable members 25, the force to remove each of the four pieces might be 25% of the force that would be required for one large adhesive of the same total surface area.

In another embodiment of this invention, each of the movable members 25 could be monitored by the merchandise display security tether 20, including various means of sensing and alarming. For example, the merchandise display security tether 20 may include circuitry for monitoring each of the movable members 25. By monitoring each of the movable members 25, the merchandise display security tether 20 could determine if the adhesive was being tampered with as soon as a potential thief starts to attempt a removal. For example, if there were four adhesives on four movable members 25, the thief would set off the alarm while attempting to defeat the first of the four movable members 25, leaving the security device still well attached to the article of merchandise M and alarming. This would likely cause the thief to stop his theft attempt for risk of being caught attempting to remove the other three adhesives while an alarm is sounding.

In the illustrated embodiments shown in FIGS. 1-5, the article of merchandise M is a tablet or laptop computer having a display screen, and the mounting base 30 (disposed within removable housing 50) is attached to the rear surface of the display screen. The housing 50 of the merchandise display security tether 20 may be generally dome-shaped to extend over and entirely cover the mounting base 30 and movable members 25. Thus, in one embodiment, the housing 50 is configured (sized and shaped) to be received on mounting base 30 in a manner that prevents access to the mounting base and the movable members 25 (and associated adhesive) of the mounting base.

In one embodiment, a security cable 80 extends between the mounting base 30 and an anchor assembly 90. Security cable 80 may, for example, comprise a generally flexible, yet relatively inelastic, steel cable jacketed with a protective covering. In some embodiments, cable 80 may include one or more conductive wires for power and alarming signals, as well as a mechanical tether. The cable 80 may also or alternatively include a cut-resistant cable, wherein each of the cables and conductive wires are surrounded by a protective sheath. The security cable 80 may be secured to a tabletop, counter, shelf or other display surface used in retail sales using the anchor assembly 90, such as via an adhesive and/or fastener(s). Regardless of the method of securing the merchandise display security tether 20 to the retail sales display, security cable 80 has a length sufficient to allow a customer to evaluate the operation and features of the article of merchandise M including, for example, determining the weight of a laptop computer and opening and closing the display screen of the laptop computer, when making a decision whether to purchase the merchandise. The cut-resistant cable may or may not be attached to the mounting base 30 and/or anchor assembly 90.

In some embodiments, the anchor assembly 90 comprises one or more ports for receiving respective cables attached to articles of merchandise M (see, e.g., FIG. 1). For example, one port may couple to a laptop or tablet device, while another port could couple to accessories such as a stylus or keyboard. In other embodiments, the anchor assembly 90 may include a plurality of ports for accommodating convertible devices or devices having components that can attach/detach from one another. The anchoring assembly 90 may further include an input power cable 100 with a plug 110 or other connector configured to couple to a power source. The anchoring assembly 90 may allow for "pass through" power whereby the anchoring assembly includes an electronic circuit, chip, board, or the like configured to determine if the input power is compatible with the requirements of the article of merchandise M. If the input power and power requirements are compatible, the power may pass through to the article of merchandise M. If the power requirements are not compatible, power may not pass through to the article of merchandise M, which prevents the article of merchandise from being damaged. In other embodiments, the anchoring assembly 90 includes a voltage regulator configured to adjust or otherwise adapt the input power to the voltage required by the article of merchandise M.

Figure 4:
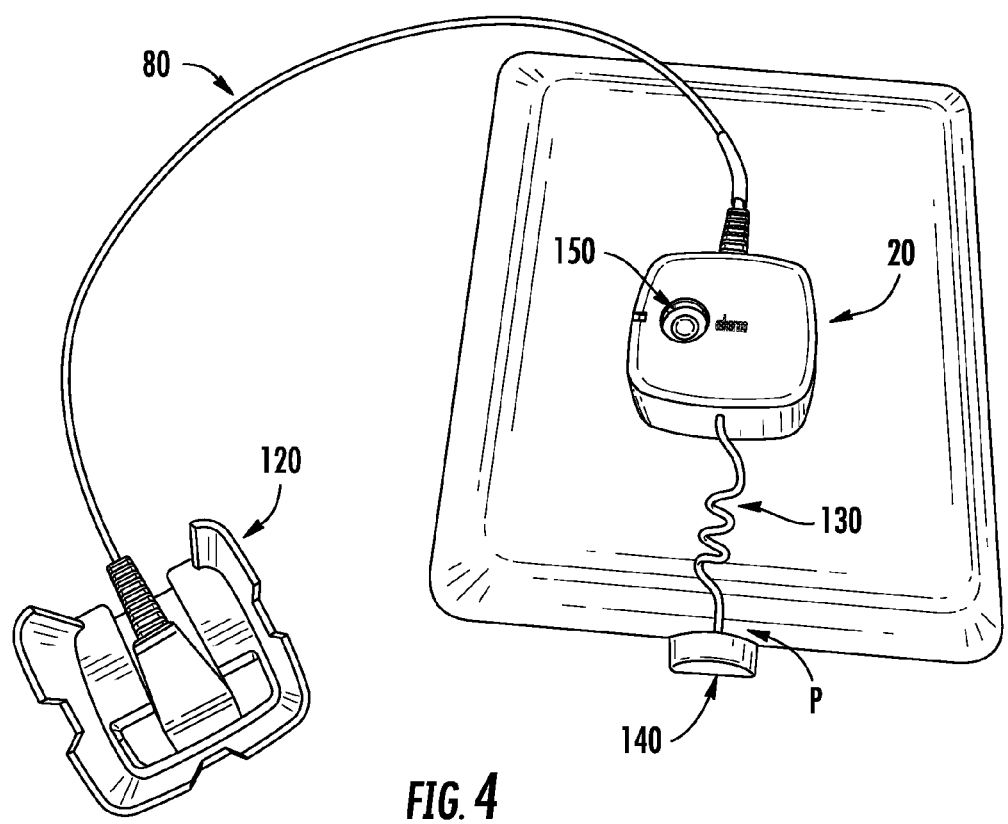
FIG. 4 is rear perspective view of a merchandise display security tether secured to an article of merchandise according to one embodiment of the present invention.

In some instances, the anchoring assembly 90 is disposed within or otherwise integrated with, a stand 120 (see, e.g., FIGS. 4 and 5). The stand 120 is configured to receive the merchandise display security tether 20 for supporting the article of merchandise M. For example, the stand 120 may include an opening and corresponding slots sized and configured for receiving the housing 50 and associated cables, respectively, wherein the article of merchandise M is displayed in a particular angle and orientation (e.g., portrait or landscape). Otherwise, the article of merchandise M may be placed directly on the display surface such that the merchandise display security tether 20 rests on the display surface. In the case where an anchoring assembly 90 or stand 120 is employed, a security device (e.g., plunger) may be coupled thereto such that removal of the anchoring assembly or stand from the display surface results in activating the plunger and transmitting an alarming signal. Similarly, the mounting base 30 may include a security device (e.g., plunger) for detecting unauthorized removal of the mounting base from the article of merchandise M.

The anchoring member 90 and/or stand 120 may be mechanically and electrically coupled to the merchandise security device 20. In addition, the cable 80 may be electrically connected to an alarming device, such as an alarming device contained within the mounting base 30 that is secured to a respective article of merchandise M. In particular, the cable 80 electrically connects the merchandise security device 20 to the external source of electrical power, and the merchandise security device may be configured to activate an audible and/or visible alarm in the event that the cable is cut, severed or removed (i.e., unplugged) from the anchoring assembly 90, stand 120, or merchandise security device 20. As such, the cable 80 may comprise a plurality of conductors disposed within a protective outer sheath in a conventional manner. At least one of the conductors conducts an electrical power signal between the external source of electrical power 100 and the merchandise security device 20. As will be understood, cable 80 alternatively may be a mechanical security cable, for example, a high strength, cut resistant cable, with or without a security signal conductor in the event that the displayed article of merchandise does not require electrical power or obtains electrical power from another power cable. Likewise, the cable 80 may alternatively be a power cable that provides electrical power to the electronic article of merchandise without a security signal conductor in the event that the mechanical security provided by the electro-mechanical cable is sufficient for protecting the article of merchandise from theft.

An alarming power cable 130 may extend between the merchandise security device 20 and a power input port P of the article of merchandise M for charging the article. The alarming power cable 130 may couple to the power input port P with a connector 140 configured for a particular article of merchandise M. The alarming power cable 130 may be replaceable for accommodating articles of merchandise having different power input ports P. The alarming power cable 130 may also include one or more conductors for transmitting electrical and security signals. At least one of the conductors conducts a security signal between the power input port P and the merchandise security device 20 (provided on the article of merchandise M), which activates an alarm in the event that the electrical signal is interrupted in one of the aforementioned manners indicating a possible theft condition. Thus, the article of merchandise M may be charged when the power cable 130 is engaged therewith, and removal of the connector 140 coupled to the power input port P may result in an alarming signal.

In one embodiment, the merchandise security device 20 may be configured to be armed and disarmed by a key or other device for arming and disarming. For example, the merchandise security device 20 may include a port 150 for wireless communication with a key. The port 150 may include circuitry for infrared (IR) or radiofrequency (RF) communication with a key transmitting associated IR or RF signals for arming and disarming the merchandise security device 20. In other embodiments, the port 150 may be programmed to recognize a specific code wirelessly transmitted by a key for arming and disarming the merchandise security device 20. In some cases, the key may communicate with the port for arming and disarming the aforementioned alarming device associated with the merchandise security device 20.

The foregoing has described one or more embodiments of a merchandise display for displaying and protecting an article of merchandise. Those of ordinary skill in the art will understand and appreciate that numerous variations and modifications of the invention may be made without departing from the spirit and scope of the invention. Accordingly, all such variations and modifications are intended to be encompassed by the appended claims.

That which is claimed is:

1. A merchandise display security device for displaying and protecting an article of merchandise from theft, the security device comprising:
   a mounting base configured to be attached to an article of merchandise; and
   a plurality of movable members coupled to the mounting base and each having an adhesive configured to releasably attach the mounting base to the article of merchandise such that the plurality of movable members are disposed between the mounting base and the article of merchandise.

2. The security device of claim 1, further comprising a housing configured to be secured to the mounting base, wherein the housing is configured to extend over and cover the mounting base to prevent access to the plurality of movable members.

3. The security device of claim 1, wherein each of the plurality of movable members is rotatably attached to the mounting base.

4. The security device of claim 1, further comprising a security cable having a first end attached to the mounting base and a second end configured to be secured to a display surface.

5. The security device of claim 4, wherein the security cable comprises an anchor assembly at the second end such that the security cable is configured to be anchored to the display surface.

6. The security device of claim 5, wherein the anchor assembly comprises a plurality of ports for electrically coupling with the article of merchandise and one or more accessories.

7. The security device of claim 1, wherein each of the plurality of movable members comprises at least one slot for receiving a removal tool.

8. The security device of claim 1, further comprising an alarming power cable extending from the mounting base and configured to engage a power input port of the article of merchandise.

9. The security device of claim 1, further comprising a port on the mounting base for communicating with a key for arming or disarming the security device.

10. A method of displaying and protecting an article of merchandise from theft, the method comprising:
   providing a merchandise display security device comprising a mounting base, the mounting base comprising a plurality of movable members each having an adhesive; and
   securing the adhesive of each of the plurality of movable members to the article of merchandise such that the plurality of movable members are disposed between the mounting base and the article of merchandise.

11. The method of claim 10, further comprising attaching one end of a security cable to a display surface, a second end of the security cable being attached to the mounting base.

12. The method of claim 10, further comprising positioning a housing over the mounting base to extend over and cover the mounting base for preventing access to the at least one movable member.

13. The method of claim 10, wherein securing comprises releasably adhering the plurality of movable members to the article of merchandise.

14. The method of claim 10, wherein each of the plurality of movable members are rotatable.

15. The method of claim 14, further comprising rotating each of the plurality of movable members relative to the mounting member for removing the movable members from the article of merchandise.

16. A merchandise display security device for displaying and protecting an article of merchandise from theft, the security device comprising:
   a mounting base configured to be attached to an article of merchandise;
   at least one rotatable member coupled to the mounting base and having an adhesive for releasably attaching the mounting base to the article of merchandise; and
   a security cable having a first end attached to the mounting base and a second end configured for attachment to a display surface.

17. The merchandise display security device of claim 16, further comprising a housing configured to be positioned over the mounting base and the at least one rotatable member, the housing being removably secured to the mounting base so as to prevent access to the at least one rotatable member.

18. The merchandise display security device of claim 16, further comprising a plurality of rotatable members each having an adhesive for releasably attaching the mounting base to the article of merchandise.

* * * * *